(12) United States Patent
Yoshida

(10) Patent No.: US 11,034,305 B2
(45) Date of Patent: Jun. 15, 2021

(54) IMAGE PROCESSING DEVICE, IMAGE DISPLAY SYSTEM, AND IMAGE PROCESSING METHOD

(71) Applicant: Panasonic Intellectual Property Management Co., Ltd., Osaka (JP)

(72) Inventor: Tadashi Yoshida, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/992,691

(22) Filed: Aug. 13, 2020

(65) Prior Publication Data

US 2020/0369207 A1    Nov. 26, 2020

Related U.S. Application Data

(63) Continuation of application No. PCT/JP2018/039984, filed on Oct. 26, 2018.

(30) Foreign Application Priority Data

Mar. 28, 2018   (JP) .............................. JP2018-062600

(51) Int. Cl.
*B60R 1/12* (2006.01)
*G06T 7/73* (2017.01)
(Continued)

(52) U.S. Cl.
CPC ................ *B60R 1/12* (2013.01); *B60K 35/00* (2013.01); *B60R 1/04* (2013.01); *B60R 11/04* (2013.01);
(Continued)

(58) Field of Classification Search
CPC .. B60R 1/12; B60R 1/04; B60R 11/04; B60R 2001/1215; B60R 2001/1253;
(Continued)

(56) References Cited

U.S. PATENT DOCUMENTS 10,112,539 B2 * 10/2018 Kameshima ........... B60K 35/00
10,275,914 B2 *  4/2019 Lang ........................ B60R 1/00
(Continued)

FOREIGN PATENT DOCUMENTS

JP       2005-335410       12/2005
JP       2012-170127        9/2012
(Continued)

OTHER PUBLICATIONS

Official Communication issued in International Patent Application No. PCT/JP2018/039984, dated Dec. 25, 2018, along with an English translation thereof.

*Primary Examiner* — James M Pontius
(74) *Attorney, Agent, or Firm* — Greenblum & Bernstein, P.L.C.

(57) ABSTRACT

An image processing device includes: an obtainer which obtains, from an imaging device provided in a vehicle so as to be oriented to capture an image of an area behind the vehicle, an image captured by the imaging device; a position detector which detects a face position of a driver; and an image processor which performs image processing to clip, according to the face position detected by the position detector, an image having a range corresponding to the face position, out of a combined image including the image, and superimpose a position image indicating a position in the vehicle, on the image at a position corresponding to the face position, and outputs an image resulting from the image processing.

15 Claims, 11 Drawing Sheets

(51) Int. Cl.
*B60K 35/00* (2006.01)
*B60R 1/04* (2006.01)
*B60R 11/04* (2006.01)
*G06K 9/00* (2006.01)

(52) U.S. Cl.
CPC ..... *G06K 9/00791* (2013.01); *G06K 9/00845* (2013.01); *G06T 7/74* (2017.01); *B60K 2370/744* (2019.05); *B60R 2001/1215* (2013.01); *B60R 2001/1253* (2013.01); *B60R 2300/105* (2013.01); *B60R 2300/202* (2013.01); *B60R 2300/303* (2013.01); *B60R 2300/8026* (2013.01); *G06T 2207/20132* (2013.01); *G06T 2207/30201* (2013.01); *G06T 2207/30252* (2013.01); *G06T 2207/30268* (2013.01)

(58) Field of Classification Search
CPC ........ B60R 2300/105; B60R 2300/202; B60R 2300/303; B60R 2300/8026; B60R 2300/8066; B60R 2300/605; B60R 2300/8046; B60R 1/00; G06T 7/74; G06T 2207/20132; G06T 2207/30201; G06T 2207/30252; G06T 2207/30268; G06T 7/73; G06T 1/00; B60K 35/00; B60K 2370/744; G06K 9/00791; G06K 9/00845; G08G 1/16; H04N 7/18
See application file for complete search history.

(56) References Cited

U.S. PATENT DOCUMENTS

| | | | | |
|---|---|---|---|---|
| 10,434,847 | B2* | 10/2019 | Yoshizumi | H04N 7/183 |
| 10,518,702 | B2* | 12/2019 | Al Rasheed | H04N 5/247 |
| 10,654,422 | B2* | 5/2020 | Karabed | G06K 9/00261 |
| 10,893,214 | B2* | 1/2021 | Sunaga | B60R 11/02 |
| 10,930,070 | B2* | 2/2021 | Watanabe | B60R 1/00 |
| 2003/0122930 | A1* | 7/2003 | Schofield | H04N 7/181 348/148 |
| 2008/0007428 | A1* | 1/2008 | Watanabe | B60R 1/00 340/901 |
| 2008/0231703 | A1* | 9/2008 | Nagata | H04N 7/181 348/148 |
| 2010/0128128 | A1* | 5/2010 | Nagamine | B60W 40/02 348/148 |
| 2014/0347488 | A1* | 11/2014 | Tazaki | B60R 1/04 348/148 |
| 2016/0288717 | A1 | 10/2016 | Kameshima et al. | |
| 2017/0336629 | A1* | 11/2017 | Suzuki | G05D 1/0088 |
| 2018/0120572 | A1* | 5/2018 | Watanabe | G02B 27/0179 |
| 2018/0265002 | A1* | 9/2018 | Kawamoto | H04N 5/23238 |
| 2019/0102634 | A1* | 4/2019 | Sagami | G06K 9/00825 |
| 2020/0150444 | A1* | 5/2020 | Nohara | G02B 27/01 |
| 2020/0184219 | A1* | 6/2020 | Mugura | B60K 35/00 |
| 2020/0210733 | A1* | 7/2020 | Noble | G06T 7/557 |

FOREIGN PATENT DOCUMENTS

| | | |
|---|---|---|
| JP | 2015-168271 | 9/2015 |
| WO | 2014/156788 | 10/2014 |

\* cited by examiner

IMAGE PROCESSING DEVICE, IMAGE DISPLAY SYSTEM, AND IMAGE PROCESSING METHOD

CROSS REFERENCE TO RELATED APPLICATIONS

This is a continuation application of PCT International Application No. PCT/JP2018/039984 filed on Oct. 26, 2018, designating the United States of America, which is based on and claims priority of Japanese Patent Application No. 2018-062600 filed on Mar. 28, 2018.

BACKGROUND

1. Technical Field

The present disclosure relates to an image processing device, an image display system, and an image processing method in which image processing is applied to an image obtained from an imaging device provided in a vehicle.

2. Description of the Related Art

Japanese Unexamined Patent Application Publication No. 2005-335410 (PTL 1) discloses an image display device which detects viewpoint coordinates of a user in a coordinate system defined on a rearview mirror on which a display for displaying an image is provided and controls, on the basis of the detected viewpoint coordinates, an image display format on the display for displaying an image.

SUMMARY

However, the techniques described in PTL 1 can be improved upon. There is a problem that it is difficult for users to understand the positional relationship between a captured image of an area behind a vehicle and a vehicle in the captured image.

In view of this, the present disclosure provides an image processing device, an image display system, and an image processing method capable of improving upon the above related art.

An image processing device according to one aspect of the present disclosure includes: an obtainer which obtains a first image from an imaging device provided in a vehicle, the first image being captured by the imaging device, the imaging device being oriented to capture an image of an area behind the vehicle; a position detector which detects a face position of a driver; and an image processor which performs image processing to clip, according to the face position detected by the position detector, a second image having a range corresponding to the face position, out of a target image including the first image, and superimpose a position image on the second image at a position corresponding to the face position, and outputs a third image resulting from the image processing, the position image indicating a position in the vehicle.

Note that these general or specific aspects may be implemented using a system, a method, an integrated circuit, a computer program, or a computer-readable recording medium such as a compact disc-read only memory (CD-ROM), or any combination of systems, methods, integrated circuits, computer programs, or recording media.

The image processing device and the like according to the present disclosure is capable of improving upon the above related art.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENT

Figure 1:
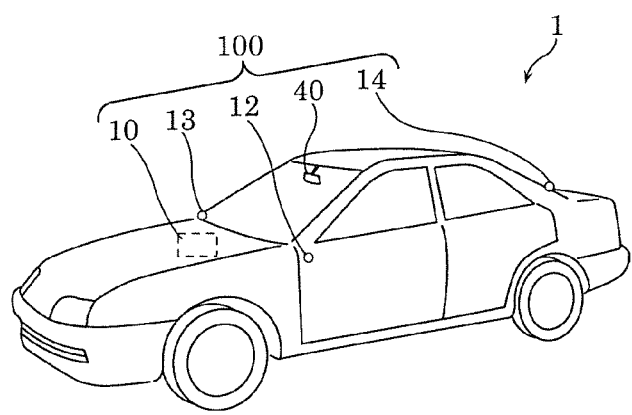
FIG. 1 is a schematic view illustrating one example of a vehicle according to an embodiment.

Underlying Knowledge Forming Basis of the Present Disclosure

The inventor found that the following problem occurs with the image display device described in the "Background Art" section.

In the image display device disclosed in PTL 1, on the basis of image information obtained by a camera, a rear-window view is displayed on the display for displaying an image, and an invisible view at a blind spot is displayed using a wire frame or the like. However, if both the rear-window view and the invisible view at a blind spot are displayed as in PTL 1, the image becomes complex, making it difficult for users to understand the positional relationship between a captured image of an area behind a vehicle and a vehicle in the captured image.

In order to solve this problem, the inventor has made diligent examination and conceived an image processing device, an image display system, and an image processing method that have the following features.

An image processing device according to one aspect of the present disclosure includes: an obtainer which obtains a first image from an imaging device provided in a vehicle, the first image being captured by the imaging device, the imaging device being oriented to capture an image of an area behind the vehicle; a position detector which detects a face position of a driver; and an image processor which performs image processing to clip, according to the face position detected by the position detector, a second image having a range corresponding to the face position, out of a target image including the first image, and superimpose a position image on the second image at a position corresponding to the face position, and outputs a third image resulting from the image processing, the position image indicating a position in the vehicle.

With this, according to the detected face position of the driver, the position of the range of an image to be clipped out of the target image including the image captured by the imaging device and the position of the position image to be superimposed on the second image are determined. Therefore, the image having an appropriate range depending on the face position of the driver can be clipped out of the target image including the captured image of an area behind the vehicle, and the position image can be superimposed on the clipped image, at an appropriate position depending on the face position. Thus, it is possible to output the captured image of the area behind the vehicle from which the vehicle positional relationship is easily understood. This enables the driver to understand the situation in the area behind the vehicle, with less discomfort, by looking at an image displayed on a display device provided as a substitute for a rearview mirror, for example.

Furthermore, the image processor may clip, out of the target image, a range estimated to be visible to the driver from the face position detected by the position detector via a display screen of a display device disposed in an interior of the vehicle when the display screen is assumed to be a mirror.

Thus, the image processing device clips, out of the target image, a range estimated to be visible to the driver who is looking at a rearview mirror; therefore, it is possible to provide an image that gives less discomfort to even a driver accustomed to rearview mirrors.

Furthermore, when the position detector detects that the face position has moved in one of left and right directions of the vehicle, the image processor may move a range in which the second image is to be clipped out of the target image to a position located in the other of the left and right directions of the vehicle relative to the range before the movement of the face position, and move a position at which the position image is to be superimposed to a position located in the one of the left and right directions of the vehicle relative to the position before the movement of the face position.

Thus, when the face position moves in one of the left and right directions, the image processing device moves the clip range in the other direction and moves, in the one direction, the position at which the position image is to be superimposed. This is because, when the face position moves in one of the left and right directions, the rearview mirror is estimated to show a range located in the other direction relative to the range before the movement. Similarly, when the face position moves in one of the left and right directions, the gaze direction via the rearview mirror moves in the other direction, and thus accessories in the interior of the vehicle are estimated to move in the one direction opposite to the other direction. In this manner, the image processing device determines the clip range and the position at which the position image is to be superimposed, and thus is capable of providing an image that gives less discomfort to even a driver accustomed to rearview mirrors.

Furthermore, when the face position moves, the image processor may set a greater distance for a first distance of travel of the position at which the position image is to be superimposed than for a second distance of travel of the range in which the second image is to be clipped out of the target image.

The imaging target in the image captured by the imaging device is present outside of the vehicle and thus is at a position farther from the driver than from the position of an accessory inside the vehicle that is shown in the position image. Therefore, when the driver who is looking at the rearview mirror moves the face position to the left or to the right, the distance of travel for the driver to a nearby accessory is greater than that to a distant target outside the vehicle. Thus, by setting the first distance greater than the second distance as mentioned above, the position of the range in which the image is to be clipped out of the target image including the image captured by the imaging device and the position at which the position image is to be superimposed on the second image can be determined so that the resultant image looks substantially the same as a view on a rearview mirror. Thus, it is possible to provide an image that gives less discomfort to even a driver accustomed to rearview mirrors.

Furthermore, the position image may be smaller than the second image and may be a schematic diagram illustrating an accessory of the vehicle that is located behind the driver.

Thus, the position image is smaller than the clipped image, enabling a reduction in the occurrence of the image after superimposition becoming complex. Furthermore, since the position image is a schematic view illustrating an accessory in the vehicle, the driver can intuitively understand, by looking at the images, the positional relationship between the vehicle and the image of the surroundings of the vehicle and the situation in the area behind the vehicle in the displayed image.

Furthermore, the image processor may change transparency of the position image according to predetermined input.

Thus, it is possible to provide an image on which a position image having transparency changed according to the preferences of the driver, the brightness in the interior of the vehicle, or the like has been superimposed, for example.

Furthermore, an illuminance sensor which detects illuminance of an area around the vehicle may further be included, the predetermined input may be the illuminance detected by the illuminance sensor, and the image processor may increase the transparency as the illuminance decreases.

With this, when the image obtained by capturing a target outside the vehicle is so dark that the target outside the vehicle is expected to be less visible, the transparency of the position image is reduced. By displaying a transparent position image, it is possible to reduce degradation of visibility of a target outside vehicle 1.

Furthermore, a storage in which a plurality of the position images of different types are stored may further be included, and the image processor may superimpose, on the second image, one or more position images selected in advance from among the plurality of the position images of the different types stored in the storage.

Thus, it is possible to provide an image that matches the preferences of the driver.

Furthermore, a determiner which determines whether or not a following vehicle behind the vehicle is within a predetermined distance from the vehicle may further be included, and when the determiner determines that the following vehicle is within the predetermined distance, the image processor is not required to superimpose the position image in the image processing.

With this, when the following vehicle approaches and appears large in the image, the image processor does not superimpose the position image; thus, it is possible to reduce discomfort that may be given to the driver due to an increase in the difference between the size of the position image and the size of the following vehicle in the image.

An image display system according to one aspect of the present disclosure includes: the above image processing device; the above imaging device; and a display device which displays the third image output by the image processing device.

Note that these general or specific aspects may be implemented using a method, an integrated circuit, a computer program, or a computer-readable recording medium such as a CD-ROM, or any combination of systems, methods, integrated circuits, computer programs, or recording media.

Hereinafter, an image processing device, an image display system, and an image processing method according to one aspect of the present disclosure will be specifically described with reference to the drawings.

Note that each embodiment described below shows a specific example of the present disclosure. The numerical values, shapes, materials, structural elements, the arrangement and connection of the structural elements, steps, the processing order of the steps etc. shown in the following embodiment are mere examples, and therefore do not limit the present disclosure. Therefore, among the structural elements in the following embodiment, structural elements not recited in any one of the independent claims defining the most generic concept are described as arbitrary structural elements.

Embodiment

An image display system according to an embodiment will be described.

1. Configuration

Figure 2:
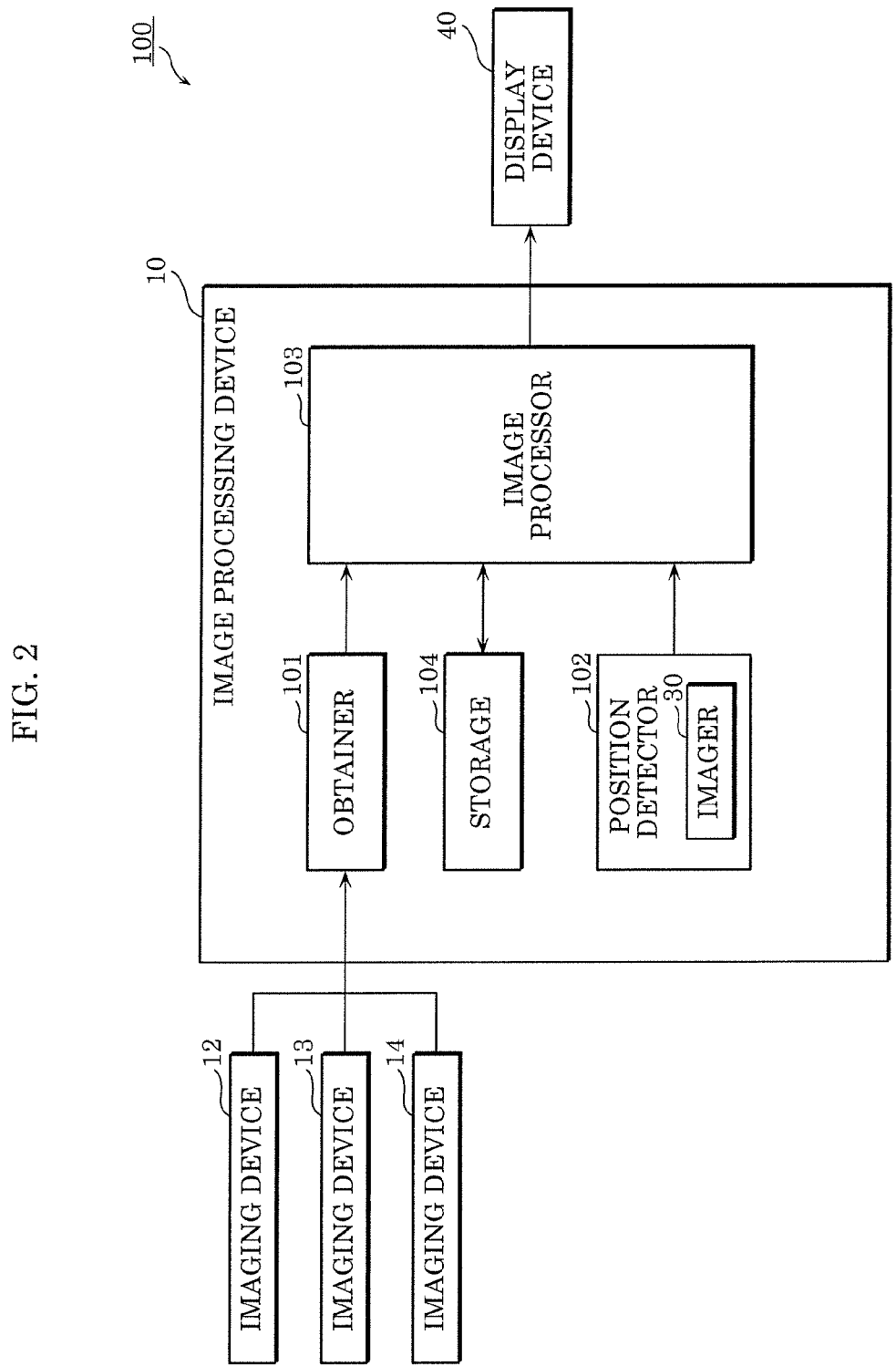
FIG. 2 is a block diagram illustrating one example of the functional configuration of an image display system according to an embodiment.
Figure 3:
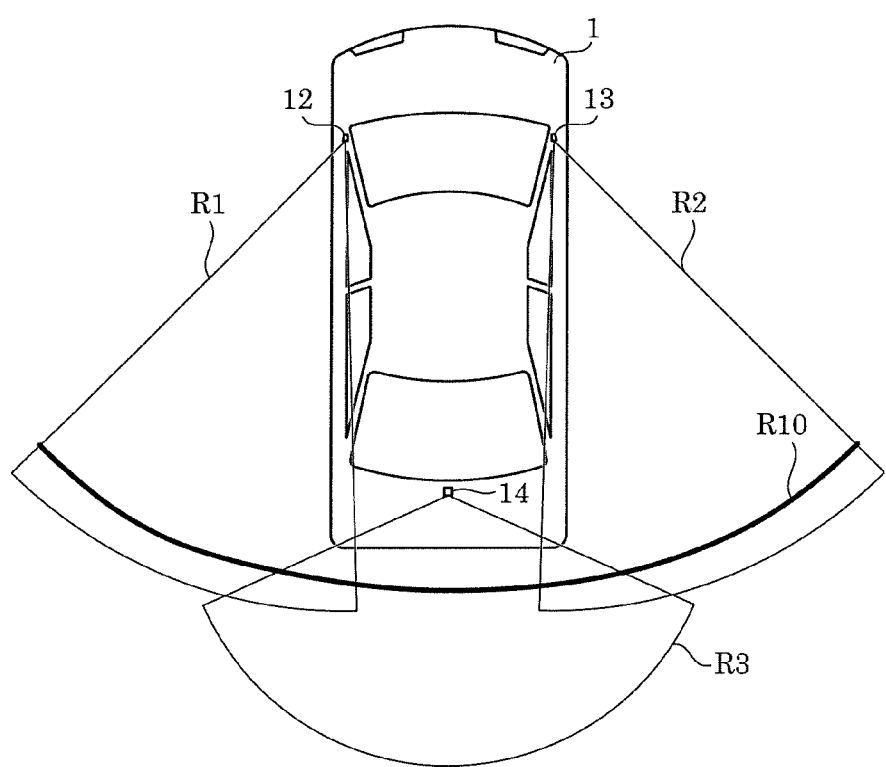
FIG. 3 is a diagram for explaining an imaging range behind a vehicle that is covered by an imaging device according to an embodiment.
Figure 4:
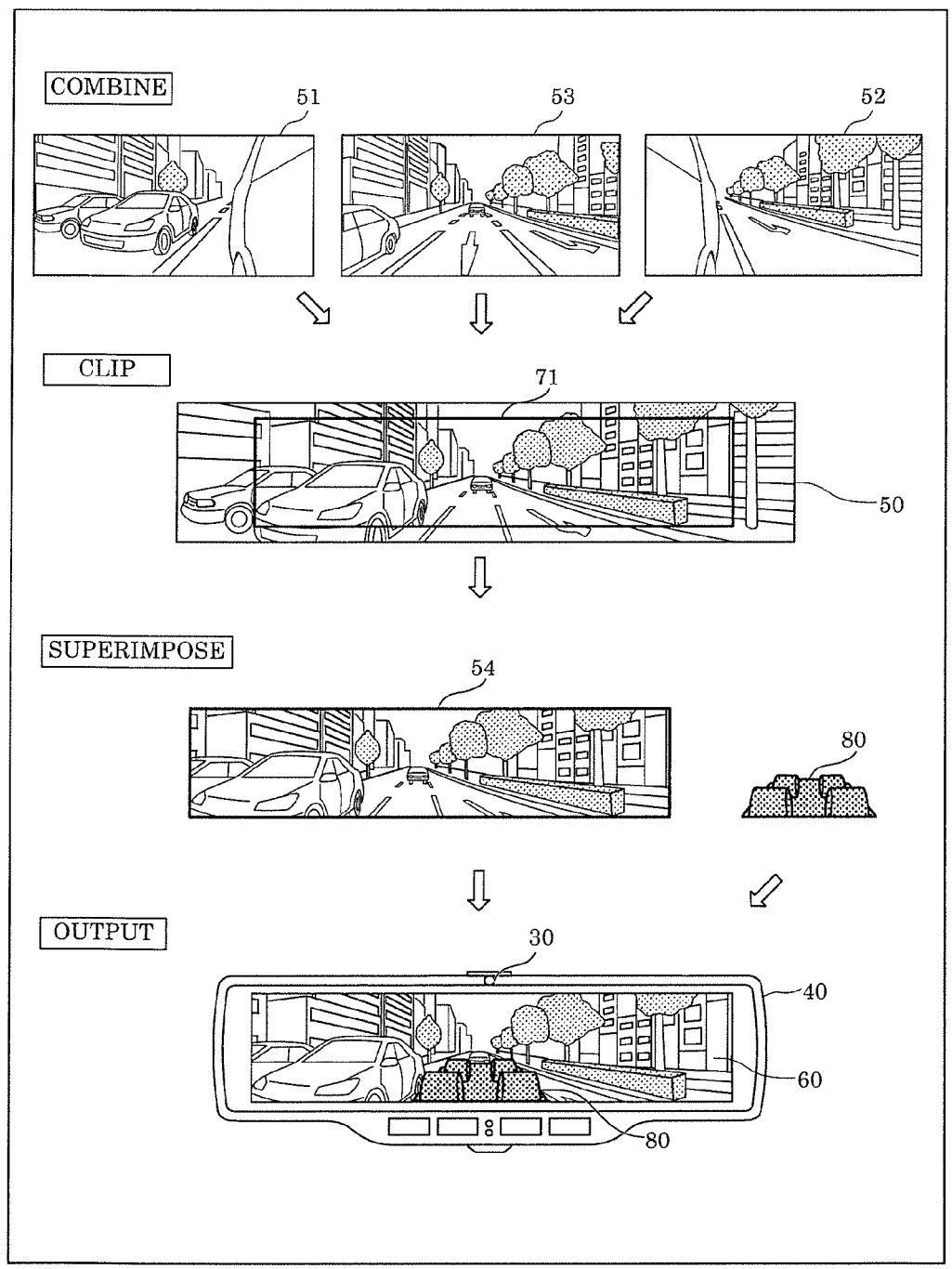
FIG. 4 is an explanatory diagram illustrating images before, after, and during imaging processing performed by an image processing device according to an embodiment.

FIG. 1 is a schematic view illustrating one example of a vehicle according to the embodiment. FIG. 2 is a block diagram illustrating one example of the functional configuration of the image display system according to the embodiment. FIG. 3 is a diagram for explaining an imaging range behind the vehicle that is covered by an imaging device according to the embodiment. FIG. 4 is an explanatory diagram illustrating images before, after, and during imaging processing performed by an image processing device according to the embodiment.

As illustrated in these figures, vehicle 1 includes image display system 100. Image display system 100 includes image processing device 10, imaging devices 12, 13, 14, and display device 40. Note that in the following description, unless otherwise noted, the longitudinal and traverse directions are based on the assumption that the direction of travel of vehicle 1 is forward, which can be said as the longitudinal and traverse directions for a user of vehicle 1.

Imaging device 12 is a camera that is fixed near a left door of vehicle 1 and photographs imaging range R1 on the left side behind vehicle 1. Imaging device 12 photographs left side imaging range R1 behind vehicle 1 to generate image 51. Image 51 generated by imaging device 12 is also referred to as a rear left image.

Imaging device 13 is a camera that is fixed near a right door of vehicle 1 and photographs imaging range R2 on the right side behind vehicle 1. Imaging device 13 photographs right side imaging range R2 behind vehicle 1 to generate image 52. Image 52 generated by imaging device 13 is also referred to as a rear right image.

Imaging device 14 is a camera that is fixed near the rear bumper or the trunk lid of vehicle 1 and photographs imaging range R3 in a center area behind vehicle 1. Imaging device 14 photographs imaging range R3 in the center area behind vehicle 1 to generate image 53. Image 53 generated by imaging device 14 is also referred to as a rear center image.

As described above, each of imaging devices 12 to 14 is provided in vehicle 1 so as to be oriented to capture an image of an area behind vehicle 1. Imaging devices 12 to 14 capture respective images in imaging ranges R1 to R3, meaning that imaging devices 12 to 14 capture an image in imaging range R10 larger than each of imaging ranges R1 to R3.

Imaging ranges R1 and R3 of imaging devices 12 and 14 partially overlap each other, and imaging ranges R2 and R3 of imaging devices 13 and 14 partially overlap each other. Therefore, the same subject appears in a part of the rear left image and in a part of the rear center image. Furthermore, the same subject appears in a part of the rear right image and in a part of the rear center image.

Imaging devices 12, 13, and 14 generate respective images through image capture under different photographing conditions. Specifically, imaging devices 12, 13, and 14 are disposed at different positions, facing different directions, and obtain respective images, for example, at 60 fps. Furthermore, the optical characteristics of respective optical systems of imaging devices 12, 13, and 14 may be different.

Image processing device 10 obtains images 51 to 53 from imaging devices 12 to 14 and outputs, on the basis of images 51 to 53, position image 80 to be displayed by display device 40. Specifically, image processing device 10 clips, out of combined image 50 of large imaging range R10 based on obtained images 51 to 53, image 54 of a range expected to be visible to the driver via a rearview mirror assuming that the rearview mirror is the display screen of display device 40 depending on the face position of the driver, and outputs image 60 based on clipped image 54. Image processing device 10 will be described later in detail.

Display device 40 displays image 60 in which a rear view of vehicle 1 appears. Display device 40 displays image 60 output by image processing device 10. Since display device 40 displays image 60 output by image processing device 10, display device 40 can be used as a substitute for a conventional rearview mirror which shows a rear view of vehicle 1 by reflection of light. Display device 40 is disposed near a front center portion of the ceiling of vehicle 1.

With reference to FIG. 2, the functional configuration of image processing device 10 will be described.

Image processing device 10 includes obtainer 101, position detector 102, image processor 103, and storage 104.

Obtainer 101 obtains, from imaging devices 12 to 14, images 51 to 53 captured by imaging devices 12 to 14. Obtainer 101 obtains images captured by imaging devices 12 to 14 at different points in time (for example, at 60 fps).

Position detector 102 detects the face position of the driver. Specifically, position detector 102 is disposed in display device 40, includes imager 30 which captures an image on the display screen side of display device 40 (in other words, the driver side of display device 40 or a rear area), and performs a facial recognition process on the image captured by imager 30 to specify the face position of the driver with respect to display device 40. Thus, position detector 102 can specify the direction from a reference position of display device 40 to the face position. Note that the reference position may be the position of imager 30 in display device 40 or may be the position of the center of display device 40 in the horizontal direction. Imager 30 is, for example, a camera. Note that position detector 102 may detect the position of an eye of the driver or may detect the position of the head of the driver to estimate the face position of the driver.

As described above, image processor 103 generates combined image 50 by combining images 51 to 53. Image processor 103 performs image processing to clip, according to the face position of the driver detected by position detector 102, image 60 having a range corresponding to the face position, out of combined image 50 serving as a target image, and superimpose position image 80 indicating a position in vehicle 1, on image 60 at a position corresponding to the face position. Subsequently, image processor 103 outputs image 60 resulting from the image processing.

When position detector 102 detects that the face position of the driver has moved in one of the left and right directions of vehicle 1, image processor 103 moves the range in which the image is to be clipped out of combined image 50 to a position located in the other of the left and right directions of vehicle 1 relative to the range before the movement of the face position, and moves the position at which position image 80 is to be superimposed to a position located in the one of the left and right directions of vehicle 1 relative to the position before the movement of the face position. An example in the case where the face position of the driver has moved to the right will be described with reference to FIG. 5 to FIG. 7.

Figure 5:
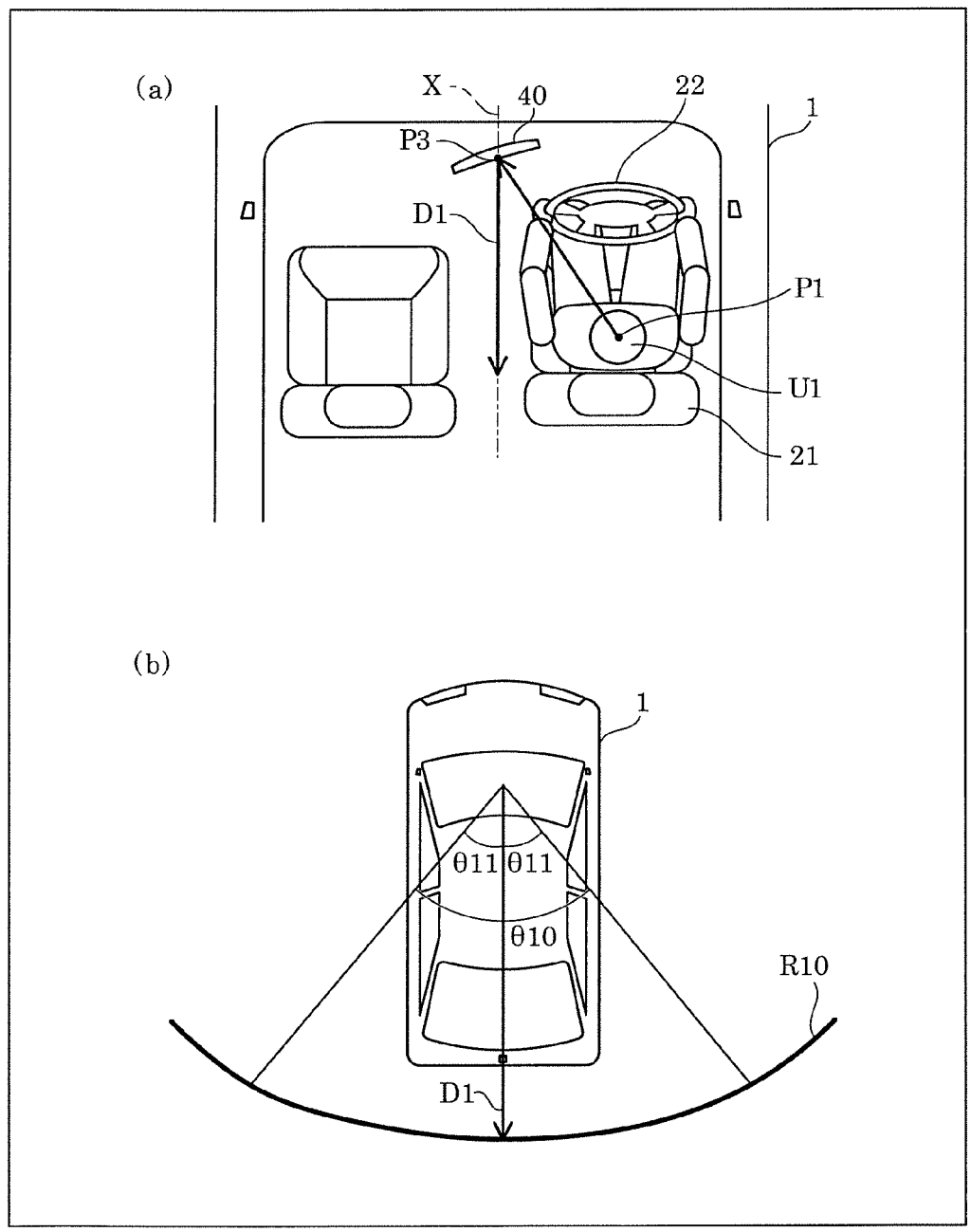
FIG. 5 is a diagram for explaining a range in which an image processor clips an image on the basis of a face position during normal driving.
Figure 6:
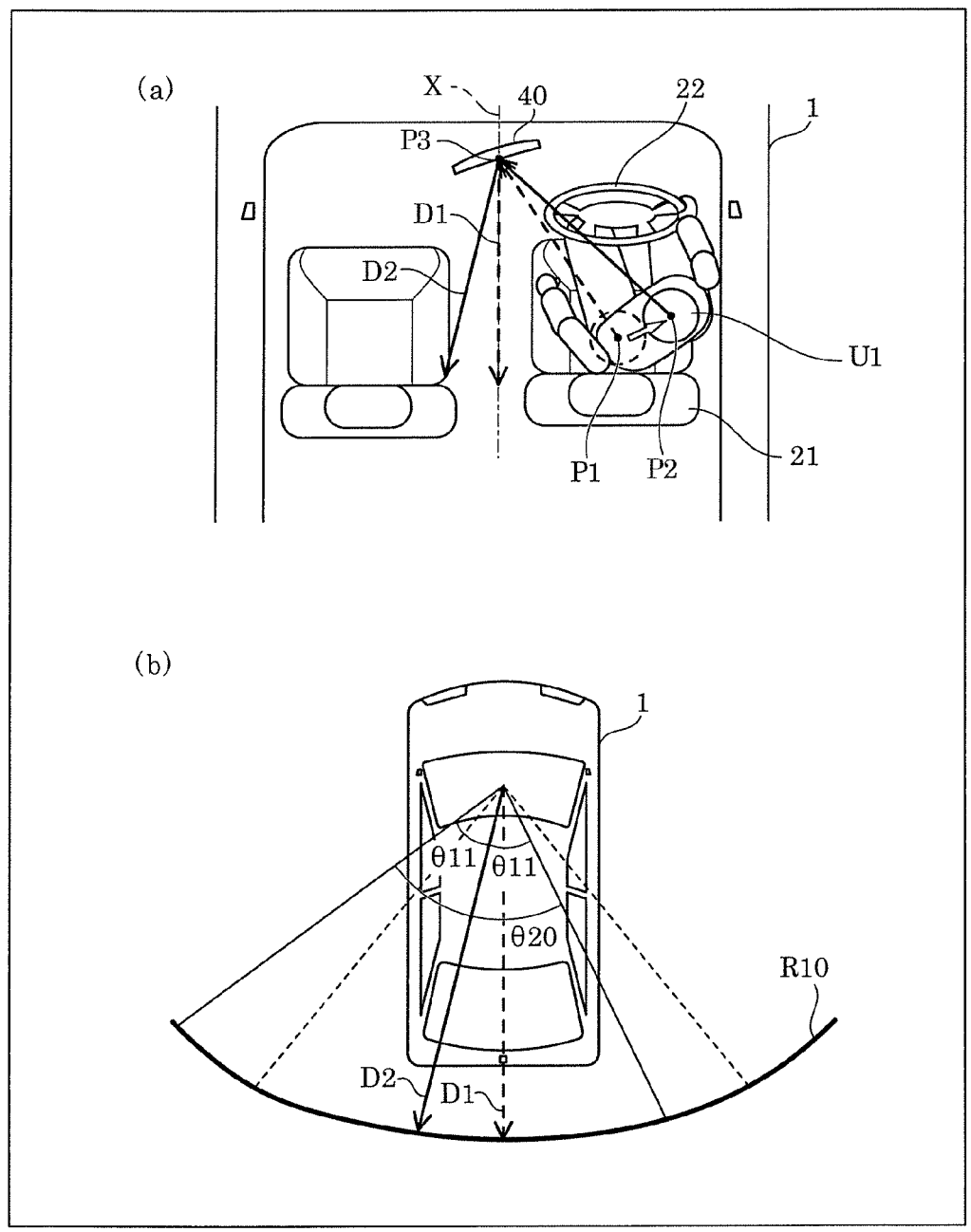
FIG. 6 is a diagram for explaining a range in which an image processor clips an image on the basis of a face position after movement.
Figure 7:
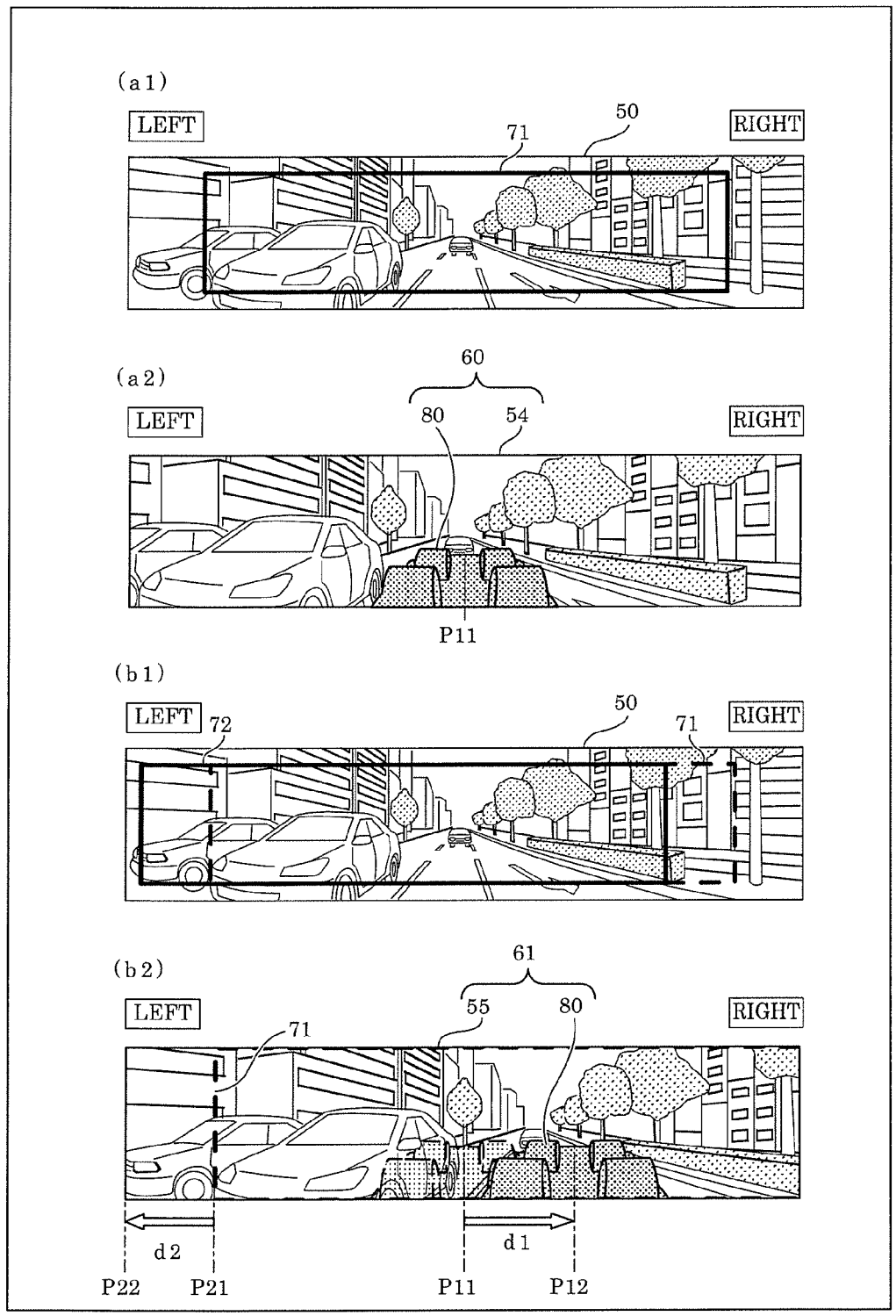
FIG. 7 is a diagram for explaining a difference in image processing of an image processor between before and after movement of a face position.

FIG. 5 is a diagram for explaining a range in which the image processer clips an image on the basis of a face position during normal driving. FIG. 6 is a diagram for explaining a range in which the image processor clips an image on the basis of a face position after movement. FIG. 7 is a diagram for explaining a difference in the image processing of the image processor between before and after the movement of the face position.

Note that in FIG. 5 and FIG. 6, (a) is a plan view of the front side in the interior of vehicle 1 from above, and (b) is a plan view of vehicle 1 from above that shows a range of the image in imaging range R10 captured by imaging devices 12 to 14 and displayed on display device 40. In FIG. 7, (a1) and (a2) are diagrams for explaining the image processing of image processor 103 in the state illustrated in FIG. 5; (a1) illustrates a processing example in which image 54 is clipped out of combined image 50, and (a2) illustrates a processing example in which position image 80 is superimposed on clipped image 54. In FIG. 7, (b1) and (b2) are diagrams for explaining the image processing of image processor 103 in the state illustrated in FIG. 6; (b1) illustrates a processing example in which image 55 is clipped out of combined image 50, and (b2) illustrates a processing example in which position image 80 is superimposed on clipped image 55. The dashed lines X in FIG. 5 and FIG. 6 indicate the longitudinal direction of vehicle 1.

Assume that as illustrated in (a) in FIG. 5, in the state before movement of the face position, for example, driver U1 grips steering wheel 22 and performs regular driving tasks and driver U1 is seated at the center of driver seat 21 of vehicle 1 in the horizontal direction. In this case, assuming that display device 40 is a rearview mirror for driver U1 with face position P1 during normal driving, the range to be clipped by image processor 103 is adjusted so that display device 40 displays an image in which direction D1 passing through the center of a field of view of driver U1 on the rearview mirror is rearward of vehicle 1. In other words, in this case, as illustrated in (b) in FIG. 5, image processor 103 determines, as the range in which an image is to be clipped, range 71 corresponding to angle range θ10 spread from the center position (the center position in the horizontal direction) of display device 40 in vehicle 1 as a starting point and centered on direction D1 in large imaging range R10. Angle range θ10 is a combination of left and right angle ranges θ11 spread from the center position of display device 40 as a starting point and centered on direction D1.

Note that the angle of display device 40 in this case is adjusted so that, assuming that the display screen of display device 40 is a rearview mirror, when driver U1 having face position P1 looks at the display screen, the range directly behind vehicle 1 is reflected on the display screen. In other words, the angle formed between the display screen of display device 40 and the line extending from face position P1 of driver U1 to center position P3 of display device 40 in the horizontal direction is substantially equal to the angle formed between the display screen of display device 40 and direction D1.

With this, as illustrated in (a1) in FIG. 7, image processor 103 obtains image 54 by clipping an image having determined range 71 out of combined image 50. Subsequently, as illustrated in (a2) in FIG. 7, image processor 103 superimposes position image 80 at center position P11 of clipped image 54 in the horizontal direction and outputs, to display device 40, image 60 obtained as a result of the superimposition. Note that image 60 is one example of an image that is output after image processing by image processor 103 before the driver moves the face position.

Next, the case where the face position has been moved will be described with reference to FIG. 6.

As illustrated in (a) in FIG. 6, assume that driver U1 has moved his or her face to the right of driver seat 21 as an example of the case where the face position has been moved. In this case, assuming that display device 40 is a rearview mirror for driver U1 with face position P2, direction D2 passing through the center of a field of view of driver U1 on the rearview mirror is further to the left than direction D1 is. In this case, as illustrated in (b) in FIG. 6, range 72 corresponding to angle range θ20 spread from the center position (the center position in the horizontal direction) of display device 40 in vehicle 1 as a starting point and centered on direction D2 in large imaging range R10 is determined as the range in which an image is to be clipped. Angle range θ20 is a combination of left and right angle ranges θ11 spread from the center position of display device 40 as a starting point and centered on direction D2.

Note that in this case, the angle formed between the display screen of display device 40 and the line extending from face position P2 of driver U1 to center position P3 of display device 40 in the horizontal direction is substantially equal to the angle formed between the display screen of display device 40 and direction D2.

With this, as illustrated in (b1) in FIG. 7, image processor 103 obtains image 55 by clipping an image having determined range 72 out of combined image 50. Subsequently, as illustrated in (b2) in FIG. 7, image processor 103 superimposes position image 80 at position P12 located to the right by first distance d1 relative to position P11 at which position image 80 is superimposed in the case of face position P1, and outputs, to display device 40, image 61 obtained as a result of the superimposition. At this time, when the face position moves from face position P1 to face position P2, image processor 103 sets first distance d1, which is a distance of travel of the position at which position image 80 is to be superimposed, greater than second distance d2, which is a distance of travel of range 71 in which image 61 is to be clipped out of combined image 50. In other words, image 61 is one example of an image that is output after image processing by image processor 103 after the driver moves the face position.

Here, first distance d1 is a distance on image 61 and is represented, for example, using the number of pixels. Second distance d2 is a distance on image 61 and is, for example, the number of pixels between position P21 of the other end portion, in the horizontal direction, of range 71 subjected to the clipping in image 61 before the movement of the face position of the driver and position P22 of the other end portion of image 61 after the movement of the face position of the driver. Alternatively, second distance d2 may be a distance on combined image 50 and may be represented using the number of pixels in an image obtained by converting combined image 50 so that an image of the same size as the size of range 71 clipped out of combined image 50 has the same resolution as the resolution of image 61.

Although the case where the face of driver U1 moves to the right has been thus far described with reference to FIG. 5 to FIG. 7, the same applies to the case where the face of driver U1 moves to the left. In this case, the clip range moves to the right, and the position at which position image 80 is superimposed moves to the left.

Note that image processor 103 may perform, in addition to the above-described image processing, processing (in other words, calibration) to adjust external parameters indicating the camera position and attitude of each of imaging devices 12 to 14 in three-dimensional space and internal parameters indicating optical properties such as the camera focal length, aberration, and the center of an image.

Storage 104 stores position image 80. Position image 80 is smaller than clipped images 54, 55, and is a schematic diagram (for example, CG) illustrating an accessory of vehicle 1 that is located behind driver U1. Position images of different types may be stored in storage 104. In this case, image processor 103 superimposes, on images 54, 55, one or more position images selected in advance from among position images 80 of different types stored in storage 104. The position image to be superimposed by image processor 103 may be an image selected by a user in advance or may be an image selected by image processing device 10 according to the factory default settings. Position image 80 may be a schematic diagram of seats of vehicle 1 as illustrated in FIG. 7 or may be a schematic diagram of other accessories of vehicle 1 such as rear wipers, rear loudspeakers, and rear pillars.

2. Operation

Next, an operation of image display system 100 will be described.

Figure 8:
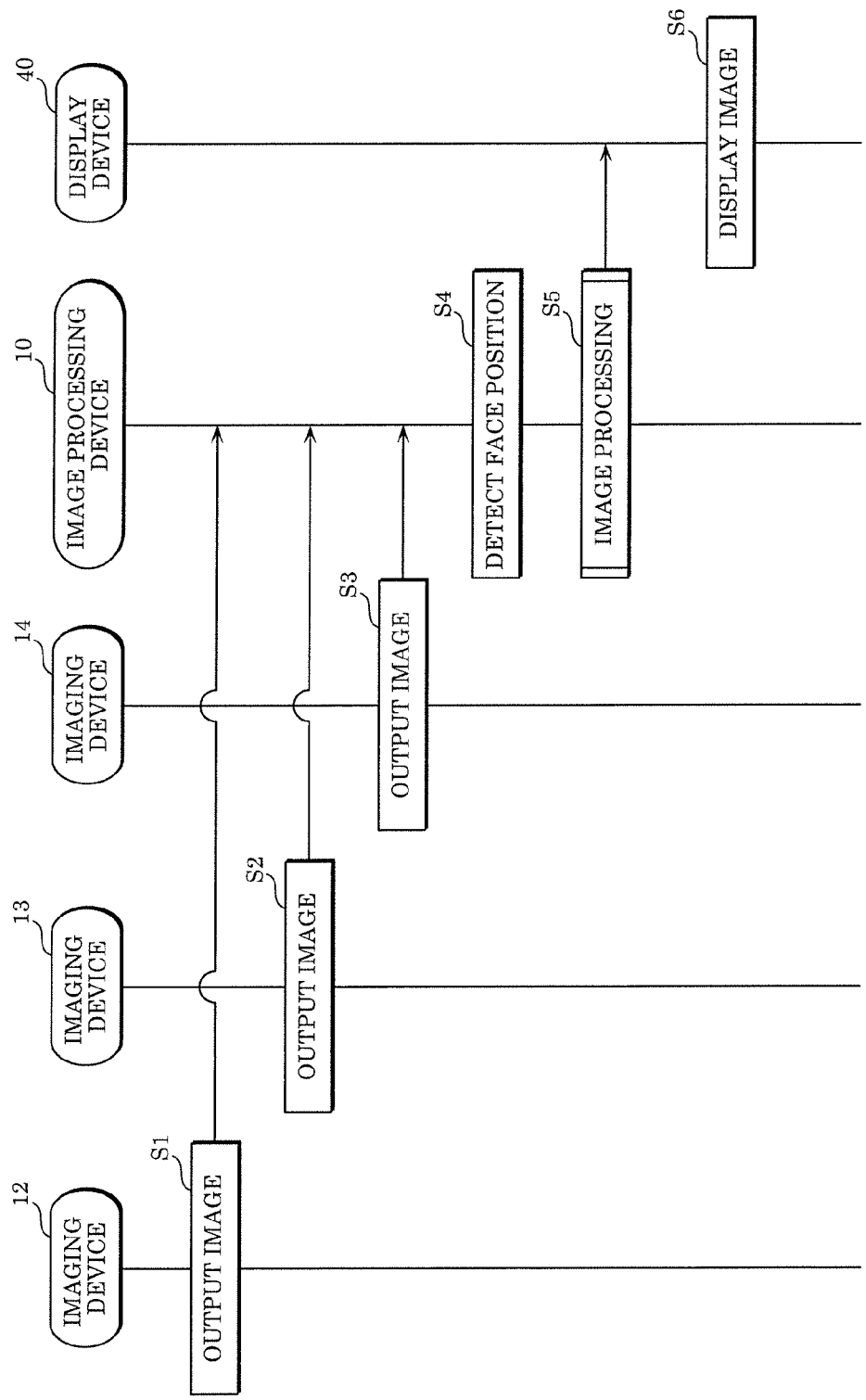
FIG. 8 is a sequence chart illustrating one example of the operation of an image display system according to an embodiment.
Figure 9:
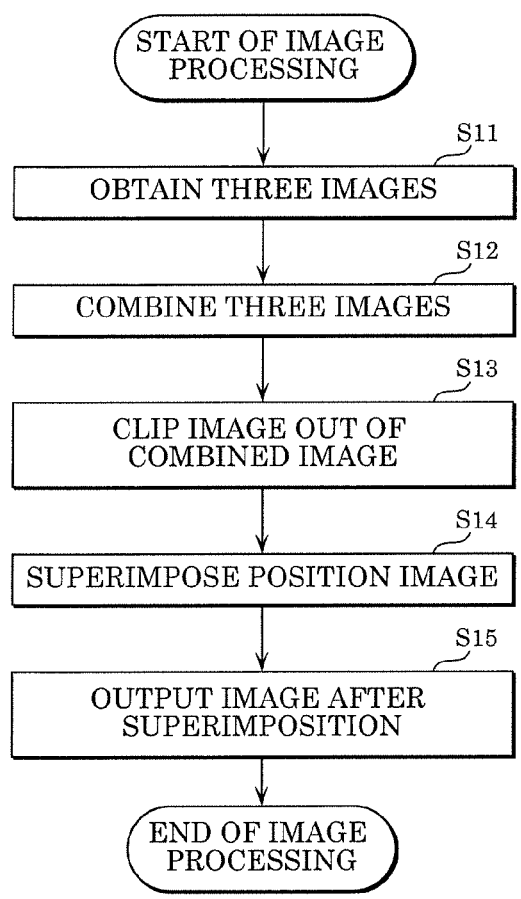
FIG. 9 is a flowchart illustrating one example of the image processing of an image processing device according to an embodiment.

FIG. 8 is a sequence chart illustrating one example of the operation of image display system 100 according to the embodiment. FIG. 9 is a flowchart illustrating one example of the image processing of the image processing device according to the embodiment.

In image display system 100, as illustrated in FIG. 8, imaging devices 12 to 14 output respective captured images (S1 to S3).

In image processing device 10, position detector 102 detects the face position of driver U1 (S4), and image processor 103 performs, on the images obtained by imaging devices 12 to 14, image processing according to the detected face position (S5) and outputs the images resulting from the image processing. Note that the image processing in Step S5 will be described later in detail.

Display device 40 obtains the image output from image processing device 10 and displays the image (S6).

In image display system 100, the processing in Steps S1 to S6 is repeatedly performed, and thus the image processing is performed real-time, according to the detected face position, on three images captured by imaging devices 12 to 14 at the same timing, and the images resulting from the image processing are displayed on display device 40.

Next, image processing performed by image processing device 10 will be described with reference to FIG. 9.

For the image processing, in image processing device 10, obtainer 101 obtains three images 51 to 53 captured by imaging devices 12 to 14 (S11).

Next, image processor 103 combines three images 51 to 53 to obtain combined image 50 (S12).

Subsequently, according to the detected face position, image processor 103 clips image 54 having range 71 corresponding to the face position in combined image 50 (S13).

Image processor 103 superimposes position image 80 at a position in clipped image 54 that corresponds to the face position (S14).

Image processor 103 outputs, to display device 40, image 60 (or image 61) on which position image 80 has been superimposed (S15).

Note that the frequency at which the processing to detect the face position is performed may be lower than the frequency of image processing. This is because, although the scenery around vehicle 1 continues to change during travel of vehicle 1 and thus it is necessary to use the latest images obtained by imaging devices 12 to 14, the frequency at which the face position moves is low, and the speed at which the face position moves is less than the speed at which vehicle 1 travels.

3. Advantageous Effects, Etc

Image processing device 10 according to the present embodiment includes obtainer 101, position detector 102, and image processor 103. Obtainer 101 obtains, from imaging devices 12 to 14, images 51 to 53 captured by imaging devices 12 to 14 provided in vehicle 1 so as to be oriented to capture images of areas behind vehicle 1. Position detector 102 detects the face position of driver U1. Image processor 103 performs image processing to clip, according to the face position detected by position detector 102, image 54 having range 71 corresponding to face position P1, out of combined image 50 obtained by combining images 51 to 53, and superimpose position image 80 indicating a position in vehicle 1, on image 54 at position P11 corresponding to face position P1, and outputs image 60 (or image 61) resulting from the image processing.

In other words, image processing device 10 determines, according to detected face position P1 of driver U1, position P21 of range 71 of image 54 to be clipped out of combined image 50 including images 51 to 53 captured by imaging devices 12 to 14 and position P11 of position image 80 to be superimposed on image 54. Therefore, image 54 having appropriate range 71 depending on face position P1 of driver U1 can be clipped out of combined image 50 including captured images 51 to 53 of areas behind vehicle 1, and position image 80 can be superimposed on clipped image 54, at appropriate position P11 depending on face position P1. Thus, it is possible to output captured image 60 (or image 61) of the area behind vehicle 1 from which the positional relationship with vehicle 1 is easily understood. This enables driver U1 to understand the situation in the area behind vehicle 1, with less discomfort, by looking at the image displayed on display device 40 provided as a substitute for a rearview mirror, for example.

Furthermore, in image processing device 10 according to the present embodiment, image processor 103 clips, out of combined image 50, range 71, 72 estimated to be visible to driver U1 from face position P1, P2 detected by position detector 102 via the display screen of display device 40 disposed in the interior of vehicle 1 when the display screen is assumed to be a mirror. Thus, image processing device 10 clips, out of the target image, the range estimated to be visible to the driver who is looking at the rearview mirror; therefore, it is possible to provide an image that gives less discomfort to even a driver accustomed to rearview mirrors.

Furthermore, in image processing device 10 according to the present embodiment, when position detector 102 detects that face position P2 has moved in one of the left and right directions of vehicle 1 (for example, to the right), image processor 103 moves range 72 in which image 54 is to be clipped out of combined image 50 to a position located in the other of the left and right directions of vehicle 1 (for example, to the left) relative to range 71 before the movement of the face position, and moves position P12 at which position image 80 is to be superimposed to a position located in the one of the left and right directions of vehicle 1 (for example, to the right) relative to position P1 before the movement of the face position.

Thus, when the face position moves in one of the left and right directions (for example, to the right) as illustrated in FIG. 6, image processing device 10 moves the clip range in the other direction (for example, to the left) and moves, in the one direction (for example, to the right), the position at which the position image is to be superimposed, as illustrated in FIG. 7. This is because, when the face position moves in one of the left and right directions (for example, to the right), the rearview mirror is estimated to show a range located in the other direction (for example, on the left side) relative to the range before the movement. Similarly, when the face position moves in one of the left and right directions (for example, to the right), the gaze direction via the rearview mirror moves in the other direction (for example, to the left) as illustrated in FIG. 6, and thus accessories in the interior of the vehicle are estimated to move in the one direction (for example, to the right) opposite to the other direction. In this manner, image processing device 10 determines the clip range and the position at which the position image is to be superimposed, and thus is capable of providing an image that gives less discomfort to even a driver accustomed to rearview mirrors.

Furthermore, in image processing device 10 according to the present embodiment, when it is detected that the face position has moved, image processor 103 sets a greater distance for first distance d1 of travel of the position at which position image 80 is to be superimposed than for second distance d2 of travel of the range in which an image is to be clipped out of combined image 50.

The imaging target in the images captured by imaging devices 12 to 14 is present outside of vehicle 1 and thus is at a position farther from driver U1 than from the position of an accessory inside vehicle 1 that is shown in position image 80. Therefore, when driver U1 who is looking at the rearview mirror moves the face position to the left or to the right, the distance of travel for driver U1 to a nearby accessory is greater than that to a distant target outside vehicle 1. Thus, by setting first distance d1 greater than second distance d2 as mentioned above, the position of the range in which the image is to be clipped out of the target image including the image captured by the imaging device and the position at which the position image is to be superimposed on the second image can be determined so that the resultant image looks substantially the same as a view on a rearview mirror. Thus, it is possible to provide an image that gives less discomfort to even a driver accustomed to rearview mirrors.

Furthermore, in image processing device 10 according to the present embodiment, position image 80 is smaller than clipped images 54, 55 and is a schematic diagram illustrating an accessory of vehicle 1 that is located behind driver U1. Thus, position image 80 is smaller than clipped images 54, 55, enabling a reduction in the occurrence of images 60, 61 after superimposition becoming complex. Furthermore, since position image 80 is a schematic view illustrating an accessory in vehicle 1, driver U1 can intuitively understand, by looking at images 60, 61, the positional relationship between vehicle 1 and images 54, 55 of the surroundings of vehicle 1 and the situation in the area behind the vehicle in displayed images 60, 61.

4. Variation 4-1. Variation 1

An image processing device according to Variation 1 will be described. The image processing device according to Variation 1 has substantially the same configuration as that in the embodiment, but is different in that image processor 103 further performs the following process.

Specifically, image processor 103 may further change the transparency of position image 80 according to predetermined input. In other words, image processor 103 may adjust the transparency of position image 80 to be superimposed on clipped images 54, 55 and superimpose position image 80 after the adjustment.

Image processor 103 may adjust the transparency of position image 80 using a value set by a user as the predetermined input, for example.

Furthermore, image processor 103 may adjust the transparency of position image 80 using, as the predetermined input, illuminance detected by an illuminance sensor, for example. In this case, image processor 103 increases the transparency of position image 80 as the illuminance detected by the illuminance sensor decreases. Note that the illuminance sensor in this case is provided in vehicle 1 and detects the illuminance of an area around vehicle 1. The illuminance sensor may be disposed inside vehicle 1 or may be disposed outside vehicle 1. The illuminance sensor may be disposed at any position as long as the illuminance of an area outside vehicle 1 can be estimated using a detection result of the illuminance sensor.

In image processing device 10 according to Variation 1, image processor 103 changes the transparency of position image 80 according to the predetermined input. Thus, it is possible to provide an image on which a position image having transparency changed according to the preferences of the driver, the brightness in the interior of the vehicle, or the like has been superimposed, for example.

Furthermore, in image processing device 10 according to Variation 1, image processor 103 increases the transparency as the illuminance detected by the illuminance sensor decreases. Therefore, when the image obtained by capturing a target outside vehicle 1 is so dark that the target outside vehicle 1 is expected to be less visible, the transparency of position image 80 is increased; thus, it is possible to reduce degradation of visibility of a target outside vehicle 1.

4-2. Variation 2

An image processing device according to Variation 2 will be described.

Figure 10:
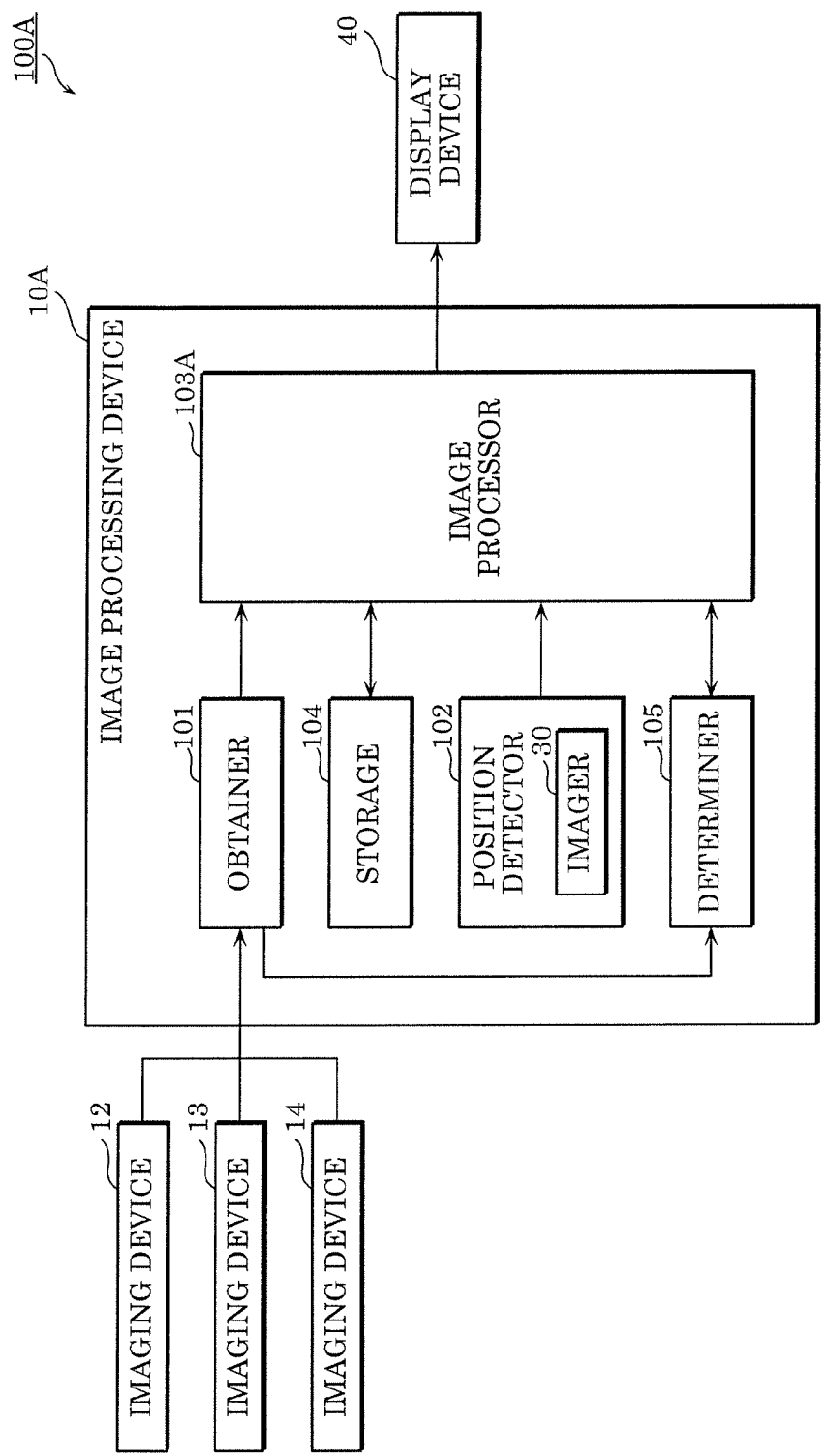
FIG. 10 is a block diagram illustrating one example of the functional configuration of an image display system according to Variation 2.

FIG. 10 is a block diagram illustrating one example of the functional configuration of the image display system according to Variation 2.

Image display system 100A according to Variation 2 is different from image display system 100 according to the present embodiment in that as illustrated in FIG. 10, image processing device 10A further includes determiner 105 and image processor 103A performs a different process. The other configuration of image display system 100A according to Variation 2 is substantially the same as that of image display system 100 according to the embodiment, and thus description thereof will be omitted.

Determiner 105 determines whether or not a following vehicle behind vehicle 1 is within a predetermined distance from vehicle 1. Determiner 105 may perform image analysis on the image obtained by imaging device 14, for example, to determine whether or not the following vehicle is within the predetermined distance. When vehicle 1 includes a distance sensor that detects the distance to an object located behind vehicle 1, determiner 105 may perform the determination using a detection result of the distance sensor.

When determiner 105 determines that the following vehicle is within the predetermined distance, image processor 103A clips, according to the detected face position, a range corresponding to the face position, out of combined image 50 and does not superimpose position image 80 in the image processing described in the embodiment.

Figure 11:
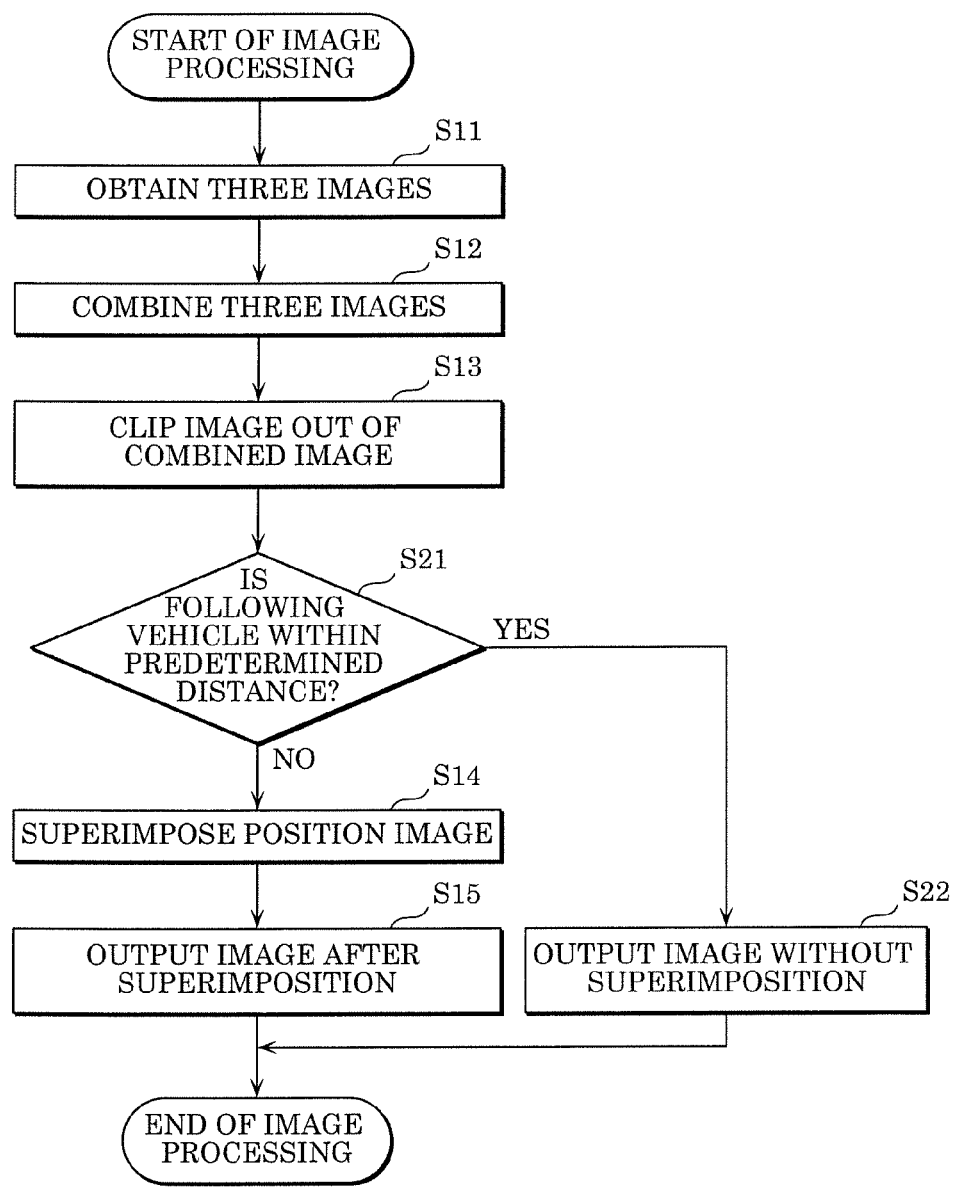
FIG. 11 is a flowchart illustrating one example of the image processing of an image processing device according to Variation 2.

FIG. 11 is a flowchart illustrating one example of the image processing of the image processing device according to Variation 2.

The image processing according to Variation 2 is different from the image processing according to the embodiment in that Steps S21, S22 are added. Description of processing that is substantially the same as the image processing according to the embodiment will be omitted.

First, Steps S11 to S13 are performed in substantially the same manner as in the embodiment.

After Step S13, determiner 105 determines whether or not a following vehicle behind vehicle 1 is within the predetermined distance from vehicle 1 (S21).

When determiner 105 determines that the following vehicle is within the predetermined distance from vehicle 1 (YES in S21), image processor 103 does not superimpose position image 80 and outputs the clipped image without the superimposition (S22).

On the other hand, when determiner 105 determines that the following vehicle is not within the predetermined distance from vehicle 1 (NO in S21), image processor 103 performs Steps S14, S15.

Thus, when the following vehicle approaches and appears large in the image, image processor 103 does not superimpose position image 80; therefore, it is possible to reduce discomfort that may be given to driver U1 due to an increase in the difference between the size of position image 80 and the size of the following vehicle in the image.

4-3. Variation 3

Image display systems 100, 100A according to the above-described embodiment and Variations 1, 2 are configured to include the plurality of imaging devices 12 to 14, but this is not limiting; the image display system may be configured to include a single imaging device.

4-4. Variation 4

In the above-described embodiment, position detector 102 includes an imager 30, and the facial recognition process is performed on the image obtained by the imager 30 to specify the face position of the driver with respect to display device 40, but this is not limiting. For example, the position detector may include a depth sensor, and the face position of the driver may be specified using a detection result of the depth sensor. Furthermore, the position detector may include a thermography device, and the face position of the driver may be specified using a detection result of the thermography device.

Note that in the above embodiment, each of the structural elements of image processing device 10 may be configured in the form of an exclusive hardware product or may be implemented by executing a software program suitable for the structural element. Each of the structural elements may be implemented by a program executing unit such as a central processing unit (CPU) or a processor reading and executing the software program recorded on a recording medium such as a hard disk or a semiconductor memory. Here, software for implementing the image processing device, etc., according to the above embodiment is a program described below.

Specifically, this program causes a computer to execute an image processing method including: obtaining a first image from an imaging device provided in a vehicle, the first image being captured by the imaging device, the imaging device being oriented to capture an image of an area behind the vehicle; detecting a face position of a driver; performing image processing to clip, according to the face position detected, a second image having a range corresponding to the face position, out of a target image including the first image, and superimpose a position image on the second image at a position corresponding to the face position, the position image indicating a position in the vehicle; and outputting a third image resulting from the image processing.

Although the image processing devices, the image display systems, the image processing methods, etc., according to one or more aspects of the present disclosure have been described based on the embodiment, the present disclosure is not limited to the embodiment. Forms obtained by various modifications to the present embodiment that can be conceived by a person having ordinally skill in the art as well as forms obtained by combining structural elements in different embodiments which are within the scope of the essence of the present disclosure may be included in one or more aspects of the present disclosure.

While various embodiments have been described herein above, it is to be appreciated that various changes in form and detail may be made without departing from the spirit and scope of the present disclosure as presently or hereafter claimed.

Further Information about Technical Background to this Application

The disclosures of the following Japanese Patent Applications including specification, drawings and claims are incorporated herein by reference in their entirety: PCT International Application No. PCT/JP2018/039984 filed on Oct. 26, 2018 and Japanese Patent Application No. 2018-062600 filed on Mar. 28, 2018.

INDUSTRIAL APPLICABILITY

The present disclosure is useful as an image processing device, an image display system, and an image processing method that make it possible to output a captured image of an area behind a vehicle from which a vehicle positional relationship is easily understood.

What is claimed is:

1. An image processing device, comprising:
    an obtainer which obtains a first image from an imaging device provided in a vehicle, the first image being captured by the imaging device, the imaging device being oriented to capture an image of an area behind the vehicle;
    a position detector which detects a face position of a driver; and
    an image processor which performs image processing to clip, according to the face position detected by the position detector, a second image having a range corresponding to the face position, out of a target image including the first image, and superimpose a position image on the second image at a position corresponding to the face position, and outputs a third image resulting from the image processing, the position image indicating a position in the vehicle, wherein
    when the position detector detects that the face position has moved in one of left and right directions of the vehicle, the image processor moves a range in which the second image is to be clipped out of the target image to a position located in the other of the left and right directions of the vehicle relative to the range before the movement of the face position, and moves a position at which the position image is to be superimposed to a position located in the one of the left and right directions of the vehicle relative to the position before the movement of the face position.

2. The image processing device according to claim 1, wherein
    the image processor clips, out of the target image, a range estimated to be visible to the driver from the face position detected by the position detector via a display screen of a display device when the display screen is assumed to be a mirror, the display device being disposed in an interior of the vehicle.

3. The image processing device according to claim 1, wherein
    when the face position moves, the image processor sets a greater distance for a first distance of travel of the position at which the position image is to be superimposed than for a second distance of travel of the range in which the second image is to be clipped out of the target image.

4. The image processing device according to claim 1, wherein
    the image processor changes transparency of the position image according to predetermined input.

5. The image processing device according to claim 4, further comprising:
    an illuminance sensor which detects illuminance of an area around the vehicle, wherein
    the predetermined input is the illuminance detected by the illuminance sensor, and
    the image processor increases the transparency as the illuminance decreases.

6. The image processing device according to claim 1, further comprising:
    a storage in which a plurality of the position images of different types are stored, wherein
    the image processor superimposes, on the second image, one or more position images selected in advance from among the plurality of the position images of the different types stored in the storage.

7. The image processing device according to claim 1, further comprising:
    a determiner which determines whether or not a following vehicle behind the vehicle is within a predetermined distance from the vehicle, wherein
    when the determiner determines that the following vehicle is within the predetermined distance, the image processor does not superimpose the position image in the image processing.

8. An image display system, comprising:
    the image processing device according to claim 1;
    the imaging device; and
    a display device which displays the third image output by the image processing device.

9. An image processing device, comprising:
    an obtainer which obtains a first image from an imaging device provided in a vehicle, the first image being captured by the imaging device, the imaging device being oriented to capture an image of an area behind the vehicle;
    a position detector which detects a face position of a driver; and
    an image processor which performs image processing to clip, according to the face position detected by the position detector, a second image having a range corresponding to the face position, out of a target image including the first image, and superimpose a position image on the second image at a position corresponding to the face position, and outputs a third image resulting from the image processing, the position image indicating a position in the vehicle, wherein
    the position image is smaller than the second image and is a schematic diagram illustrating an accessory of the vehicle, the accessory being located behind the driver.

10. The image processing device according to claim 9, wherein
    the image processor changes transparency of the position image according to predetermined input.

11. The image processing device according to claim 10, further comprising:
    an illuminance sensor which detects illuminance of an area around the vehicle, wherein
    the predetermined input is the illuminance detected by the illuminance sensor, and
    the image processor increases the transparency as the illuminance decreases.

12. The image processing device according to claim 9, further comprising:
    a storage in which a plurality of the position images of different types are stored, wherein
    the image processor superimposes, on the second image, one or more position images selected in advance from among the plurality of the position images of the different types stored in the storage.

13. The image processing device according to claim 9, further comprising:
    a determiner which determines whether or not a following vehicle behind the vehicle is within a predetermined distance from the vehicle, wherein when the determiner determines that the following vehicle is within the predetermined distance, the image processor does not superimpose the position image in the image processing.

14. An image display system, comprising:
the image processing device according to claim 9;
the imaging device; and
a display device which displays the third image output by the image processing device.

15. An image processing method, comprising:
obtaining a first image from an imaging device provided in a vehicle, the first image being captured by the imaging device, the imaging device being oriented to capture an image of an area behind the vehicle;
detecting a face position of a driver;
clipping, according to the face position detected, a second image having a range corresponding to the face position, out of a target image including the first image, and superimposing a position image on the second image at a position corresponding to the face position, the position image indicating a position in the vehicle;
performing image processing to, when the face position has moved in one of left and right directions of the vehicle, move a range in which the second image is to be clipped out of the target image to a position located in the other of the left and right directions of the vehicle relative to the range before the movement of the face position, and move a position at which the position image is to be superimposed to a position located in the one of the left and right directions of the vehicle relative to the position before the movement of the face position; and
outputting a third image resulting from the image processing.

* * * * *